(12) United States Patent
Kagan et al.

(10) Patent No.: US 8,346,907 B2
(45) Date of Patent: Jan. 1, 2013

(54) METHOD AND SYSTEM FOR CONSTRAINING SERVER USAGE IN A DISTRIBUTED NETWORK

(75) Inventors: Marty Kagan, North Hollywood, CA (US); Sylvain Lauzac, Seattle, WA (US); Eisar Lipkovitz, San Francisco, CA (US)

(73) Assignee: Akamai Technologies, Inc., Cambridge, MA (US)

( * ) Notice: Subject to any disclaimer, the term of this patent is extended or adjusted under 35 U.S.C. 154(b) by 0 days.

(21) Appl. No.: 13/189,780

(22) Filed: Jul. 25, 2011

(65) Prior Publication Data

US 2011/0282990 A1    Nov. 17, 2011

Related U.S. Application Data

(60) Continuation of application No. 12/118,777, filed on May 12, 2008, now Pat. No. 7,987,252, and a division of application No. 10/830,802, filed on Apr. 23, 2004, now Pat. No. 7,373,416.

(51) Int. Cl.
*G06F 15/173* (2006.01)
*G06F 15/16* (2006.01)

(52) U.S. Cl. .......... 709/223; 709/232; 709/233
(58) Field of Classification Search .......... 709/224, 709/223, 232, 233
See application file for complete search history.

(56) References Cited

U.S. PATENT DOCUMENTS

| | | | | |
|---|---|---|---|---|
| 6,640,240 | B1 * | 10/2003 | Hoffman et al. | 709/203 |
| 7,370,120 | B2 * | 5/2008 | Kirsch et al. | 709/246 |
| 7,395,355 | B2 * | 7/2008 | Afergan et al. | 709/247 |
| 7,752,258 | B2 * | 7/2010 | Lewin et al. | 709/203 |

\* cited by examiner

*Primary Examiner* — Kristie Shingles
(74) *Attorney, Agent, or Firm* — David H. Judson

(57) ABSTRACT

A "velvet rope" mechanism that enables customers of a shared distributed network (such as a content delivery network) needing to control their costs to control the amount of traffic that is served via the shared network. A given server in the distributed network identifies when a customer is about to exceed a bandwidth quota as a rate (bursting) or for a given billing period (e.g., total megabytes (MB) served for a given period) and provides a means for taking a given action based on this information. Typically, the action taken would result in a reduction in traffic served so that the customer can constrain its usage of the shared network to a given budget value.

10 Claims, 1 Drawing Sheet

METHOD AND SYSTEM FOR CONSTRAINING SERVER USAGE IN A DISTRIBUTED NETWORK

This application is a continuation of Ser. No. 12/118,777, filed May 12, 2008, now U.S. Pat. No. 7,987,252, which application was a division of Ser. No. 10/830,802, filed Apr. 20, 2004, now U.S. Pat. No. 7,373,416, which application was based on Ser. No. 60/465,145, filed Apr. 24, 2003.

This application includes subject matter that is protected by copyright.

BACKGROUND OF THE INVENTION

1. Technical Field

The present invention relates generally to techniques for content delivery.

2. Description of the Related Art

It is known in the art for a content provider to outsource its content delivery requirements to a content delivery network (a "CDN"). A content delivery network is a collection of content servers and associated control mechanisms that off-load work from Web site origin servers by delivering content on their behalf to end users. A well-managed CDN achieves this goal by serving some or all of the contents of a site's Web pages, thereby reducing the customer's infrastructure costs while enhancing an end user's browsing experience from the site. For optimal performance, the CDN service provider may maintain an objective, detailed, real-time view of the Internet's topology, reliability, and latency, and this view may then be used to power a dynamic DNS-based system to direct end users to the best CDN server to handle a particular request.

The CDN service provider (or the CDN customer itself) may desire to have a way to constrain a particular customer's use of the CDN in a given manner, e.g., to a given contractual limit. In particular, some CDN customers contract with the CDN service provider to be charged a certain amount for traffic delivered from the CDN servers up to a given "bursting" level. In such cases the customer may desire to avoid a bursting situation, which is typically associated with a higher CDN charge. Thus, for customers that desire to stay within their planned cost budgets, it would be desirable for the CDN service provider to be able to throttle the outbound traffic from a given server or server cluster "on-demand" or under certain circumstances.

The present invention addresses this problem.

BRIEF SUMMARY OF THE INVENTION

The subject matter described herein provides a "velvet rope" mechanism by which server in a distributed network can identify when a customer is about to exceed a bandwidth quota as a rate (bursting) or for a given billing period (e.g., total megabytes (MB) served for a given period) and provides a means for taking action on this information. Typically, the action taken would result in a reduction in traffic served so that the customer can constrain its usage to a given budget value. For example, as a Web site begins to burst, the server, which may be an edge server in a content delivery network, might serve a lighter version of the page or streaming content. At a given extreme, the server might simply return a "try again later" message (or words to that effect) until the traffic load drops to within the acceptable limits. In another example, if a monthly use quota for the customer has been exceeded, the server could begin redirecting clients to the customer's origin site (or to another location) to be served directly. Of course, the above examples are merely illustrative.

In a given implementation, a server process queries a data aggregation mechanism for given aggregate statistics (e.g., month-to-date bandwidth, and/or current bandwidth) per content provider (cp) code, and then makes this variable data available, via either metadata or Edge Side Include (ESI) match tags, or both, so that customers can dynamically modify their site based on approximate load information.

The foregoing has outlined some of the more pertinent features of the invention. These features should be construed to be merely illustrative. Many other beneficial results can be attained by applying the disclosed invention in a different manner or by modifying the invention as will be described.

DETAILED DESCRIPTION OF THE PREFERRED EMBODIMENT

By way of background, it is known to deliver digital content (e.g., HTTP content, streaming media and applications) using an Internet content delivery network (CDN). A CDN is a network of geographically distributed content delivery nodes that are arranged for efficient delivery of content on behalf of third party content providers. Typically, a CDN is implemented as a combination of a content delivery infrastructure, a request-routing mechanism (preferably based in DNS), and a distribution infrastructure. The content delivery infrastructure usually comprises a set of "surrogate" origin servers that are located at strategic locations (e.g., Internet network access points, Internet Points of Presence, and the like) for delivering content to requesting end users. The request-routing mechanism allocates servers in the content delivery infrastructure to requesting clients in a way that, for web content delivery, minimizes a given client's response time and, for streaming media delivery, provides for the highest quality. The distribution infrastructure consists of on-demand or push-based mechanisms that move content from the origin server to the surrogates. An effective CDN serves frequently accessed content from a surrogate that is optimal for a given requesting client. In a typical CDN, a single service provider operates the request-routers, the surrogates, and the content distributors. In addition, that service provider establishes business relationships with content publishers and acts on behalf of their origin server sites to provide a distributed delivery system.

Figure 1:
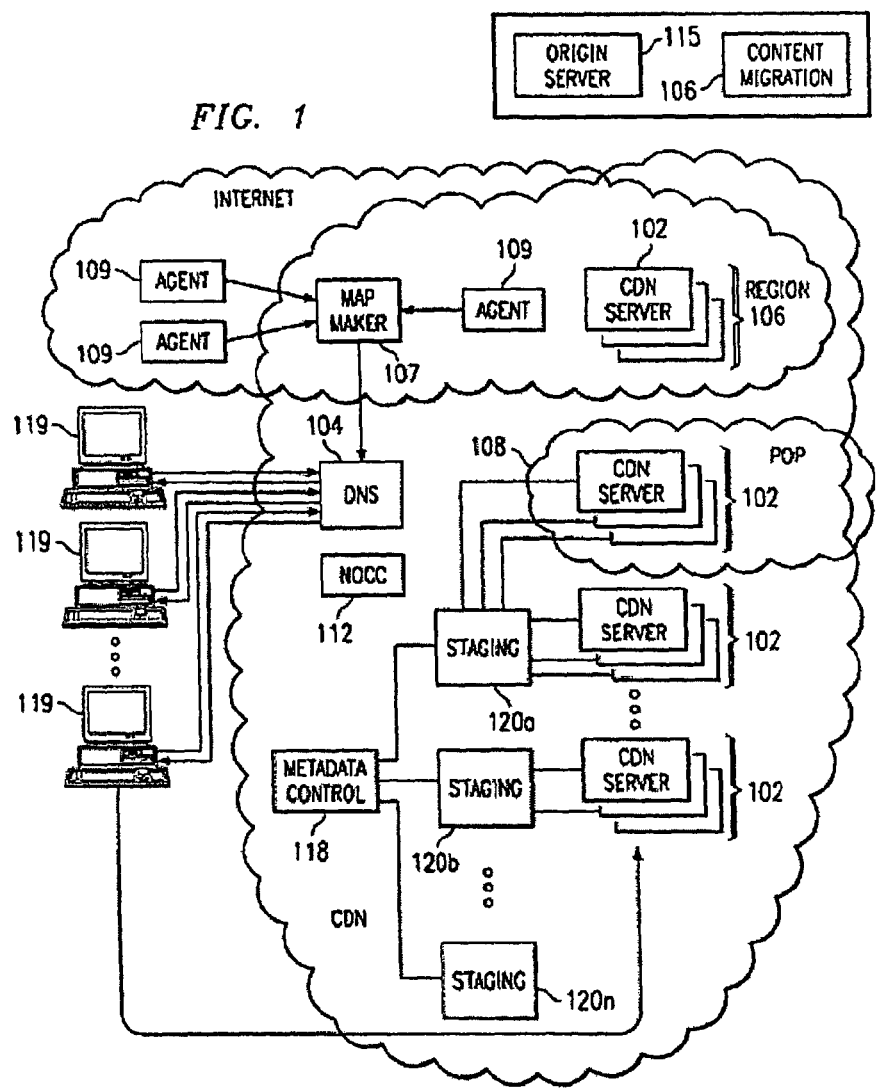
FIG. 1 is a block diagram of a known content delivery network in which the present invention may be implemented.

As seen in FIG. 1, an Internet content delivery infrastructure usually comprises a set of "surrogate" origin servers 102 that are located at strategic locations (e.g., Internet network access points, and the like) for delivering copies of content to requesting end users 119. A surrogate origin server is defined, for example, in IETF Internet Draft titled "Requirements for Surrogates in the HTTP" dated Aug. 9, 2000, which is incorporated herein by reference. The mechanism 104 allocates servers 102 in the content delivery infrastructure to requesting clients. Typically, the mechanism 104 is implemented within (or as an adjunct to) a DNS subsystem managed by the CDN service provider. The distribution infrastructure consists of on-demand or push-based mechanisms that move content from the origin server to the surrogates. A CDN service provider (CDNSP) may organize sets of surrogate origin servers as a group or so-called "region." In this type of arrangement, a CDN region 106 typically comprises a set (or cluster) of one or more content servers that share a common back-end network, e.g., a LAN, and that are located at or near an Internet access point. Thus, for example, a typical CDN region may be co-located within an Internet Service Provider (ISP) Point of Presence (PoP) 108. A representative CDN content server is a Pentium-based caching appliance running an operating system (e.g., Linux, Windows NT, Win2K) and having suitable RAM and disk storage for CDN applications and content delivery network content (e.g., HTTP content, streaming media and applications). Such content servers are sometimes referred to as "edge" servers as they are located at or near the so-called outer reach or "edge" of the Internet. The CDN typically also includes network agents 109 that monitor the network as well as the server loads. These network agents are typically co-located at third party data centers or other locations. Mapmaker software 107 receives data generated from the network agents and periodically creates maps that dynamically associate IP addresses (e.g., the IP addresses of client-side local name servers) with the CDN regions.

Content may be identified for delivery from the CDN using a content migrator or rewrite tool 106 operated, for example, at a participating content provider server. Tool 106 rewrites embedded object URLs to point to the CDNSP domain. A request for such content is resolved through a CDNSP-managed DNS to identify a "best" region, and then to identify an edge server within the region that is not overloaded and that is likely to host the requested content. Instead of using content provider-side migration (e.g., using the tool 106), a participating content provider may simply direct the CDNSP to serve an entire domain (or sub-domain) by a DNS directive (e.g., a CNAME). In either case, the CDNSP may provide object-specific metadata to the CDN content servers to determine how the CDN content servers will handle a request for an object being served by the CDN. Metadata, as used herein, refers to a set of control options and parameters for the object (e.g., coherence information, origin server identity information, load balancing information, customer code, other control codes, etc.), and such information may be provided to the CDN content servers via a configuration file, in HTTP headers, or in other ways. The Uniform Resource Locator (URL) of an object that is served from the CDN in this manner does not need to be modified by the content provider. When a request for the object is made, for example, by having an end user navigate to a site and select the URL, a customer's DNS system directs the name query (for whatever domain is in the URL) to the CDNSP DNS request routing mechanism. A representative CDN DNS request routing mechanism is described, for example, in U.S. Pat. No. 6,108,703, the disclosure of which is incorporated herein by reference. Once an edge server is identified, the browser passes the object request to the server, which applies the metadata supplied from a configuration file or HTTP response headers to determine how the object will be handled. The CDN may also include other infrastructure, such as a distributed data query and collection system that collects usage and other data from the edge servers, aggregates that data across a region or set of regions, and passes that data to other back-end systems to facilitate monitoring, logging, alerts, billing, management and other operational and administrative functions.

As also seen in FIG. 1, the CDNSP also may operate a metadata transmission (MDT) system 116 comprising a set of one or more servers to enable metadata to be provided to the CDNSP content servers. The system 116 may comprise at least one control server 118, and one or more staging servers 120*a*-*n*, each of which is typically an HTTP server (e.g., Apache). Metadata is provided to the control server 118 by the CDNSP or the content provider (e.g., using a secure extranet application) and periodically delivered to the staging servers 120*a*-*n*. The staging servers deliver the metadata to the CDN content servers as necessary.

The above described content delivery network is merely illustrative. The present invention may leverage any content delivery infrastructure.

Figure 2:
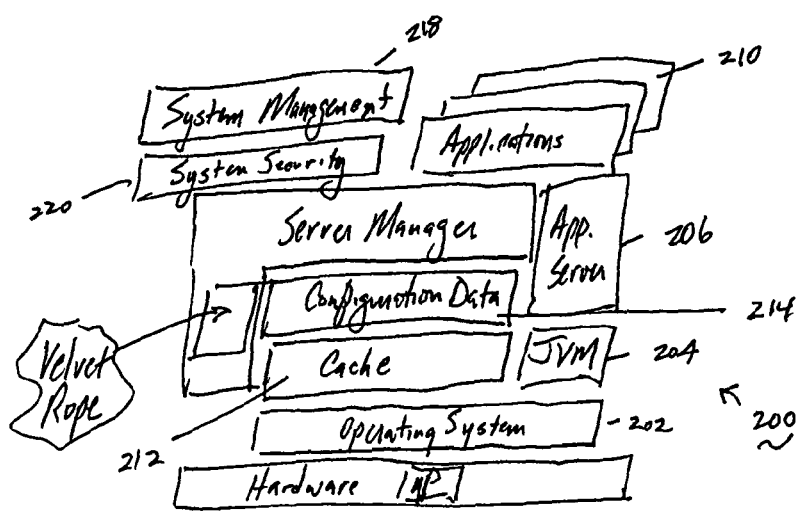
FIG. 2 illustrates a typical machine configuration for a CDN edge server.

FIG. 2 illustrates a typical machine configuration for a CDN content edge server. Typically, the server 200 preferably comprises commodity hardware running an operating system (e.g., a modified form of Linux) 202. The machine may optionally include a Java Virtual Machine (JVM) 204 and an application server 206 to facilitate the execution of one or more customer application or application components 210. For HTTP or streaming media caching, the server 200 implements a cache 212 and maintains customer configuration data 214, typically in the form of customer-specific metadata. A server manager 216 overlays and controls the cache 212, using the customer configuration data. System management 218 and system security 220 modules are also provided to facilitate these and other conventional functions.

The CDN service provider (or the CDN customer itself) may desire to have a way to constrain a particular customer's use of the CDN in a given manner, e.g., to a given contractual limit. In particular, some CDN customers contract with the CDN service provider to be charged a certain amount for traffic delivered from the CDN servers up to a given "bursting" level. In such cases the customer may desire to avoid a bursting situation, which is typically associated with a higher CDN charge. Thus, for customers that desire to stay within their planned cost budgets, it would be desirable for the CDN service provider to be able to throttle the outbound traffic from the server "on-demand" or under certain circumstances. A mechanism that can enforce such usage is sometimes referred to herein as a "velvet rope." According to the present invention, the server manager 216 implements the velvet rope mechanism, although the mechanism may be implemented in separate code. Generalizing, the velvet rope mechanism is software code (namely, a set of instructions) that identifies when a customer is about to exceed a given metric, such as a bandwidth quota as a rate (bursting) or for a given billing period (e.g., total MB served for a given period), and that takes a given action (or causes a given action to be taken) based on this information. In one embodiment, the given action constrains the customer from serving additional bytes from the server, i.e., it results in a reduction in traffic served for that customer. Alternatively, the given action returns a lighter (smaller) version of a requested page, page object or stream. Yet another alternative is that the given action redirects the request elsewhere. Another given action might be to generate an alert. These are merely representative actions, of course.

The following describes a representative implementation, which is not to be taken by way of limitation. On regular intervals, bandwidth usage tables showing current bandwidth use and month-to-date bandwidth use for each customer (or customer billing code) are delivered to (i.e., pushed out) the edge servers that will implement this functionality. The metadata (or any other convenient) transport system may be used for this purpose. When the velvet rope feature is enabled for a given customer, the edge server checks the values in the tables against thresholds set in the configuration files to determine whether a given request should be served as usual or some alternate action taken. Of course, each customer may have its own distinct velvet rope configuration parameters, and a particular customer might also desire a different velvet rope configuration at different times or under given circumstances. All such configuration options can be varied.

By way of additional background, as used herein, a current bandwidth is the traffic in megabits per second (Mbps). In a representative embodiment, this number is averaged over a given number (e.g., 3) windows of a given time (e.g., 3 seconds) each (for each edge server). The data is these tables will be, at most, a given age (e.g., ten minutes old). A total month-to-date bandwidth is a historical number of total bytes served by the network (or some portion of the network). This information preferably will be current to within a given time period (e.g., a few hours). Of course, all of these variables are configurable, and their use in the invention is described below.

Note that in configuring the thresholds for initiating alternate action, the CDN service provider (or the customer) can specify more than one threshold and different actions depending on the threshold that was exceeded. For example, if the site is bursting only very slightly due to heavy demand on cacheable content, it may be desired to serve a lighter version of the content (e.g., a lower resolution video stream, for example). If, however, the bursting passes a somewhat higher threshold, it might be necessary to turn away new end-user requests until the traffic has subsided.

If desired, the information in the bandwidth usage tables (or other data structures) may be passed to Edge Side Include (ESI) markup tags within a given page being served from the edge server. In this embodiment, it is assumed that the edge server includes a mechanism to process ESI tags in markup language pages. ESI pages could then be coded to automatically serve different versions of content based on the bandwidth usage. Typically, the ESI code is provided by a content provider customer; this provides the customer with maximum control over which alternative actions are taken and how often these settings are changed. Further details about ESI tags and associated mechanisms are available at www.esi.org/.

Configuring the velvet rope mechanism for a site involves (1) identifying the appropriate thresholds, (2) determining how best to reduce bandwidth consumption if thresholds are met, and (3) determining which mechanism (e.g., configuration files, ESI code, or the like) is most appropriate for enforcing the reduction in bandwidth consumption. When this functionality is geared towards constraining bandwidth usage to contracted or budgeted levels, the appropriate thresholds for enforcing a reduction in usage can usually be identified from the contract or budget. The other two questions typically depend on the nature of the content being served and the traffic pattern for the site.

The following are additional implementation details. To implement the feature, several metadata tags may be used and managed by the server manager (or some other implementing) process in the edge server. In an illustrative embodiment, these include (a) metadata to configure the server manager process to read information from given data tables, e.g., tables that contain data identifying traffic served by content provider (CP) code (or other metric), and (b) a match tag to match on content derived from the table. Using this match, the edge server can test when a given quota has been exceeded and apply metadata within the match to modify the edge server's behavior. For example, one action might be a redirect to another server or the customer's origin server to serve the content or serve a "light" version of the content, and thus reduce bandwidth usage. When this match evaluates true, an indication also may be saved in a log. If desired, a metadata tag may also be used to configure passing information in the table to ESI in a header, for example. An ESI mechanism implemented in the edge server manager process can then use this information to compose a "light" or alternative version of the content dynamically.

Preferably, there are two tables of information for the velvet rope mechanism: tables.data.sum_bw, which associates megabytes per CP code from the beginning of the month, and tables.data.current_bw, which associates megabytes per second per CP code. The following is a representative two-column format of CP codes and related bandwidth for the sum_bw table:

| CPCODE | TOT_BYTES |
|--------|-----------|
| 1      | 4,000     |
| 7      | 9,852     |
| 27     | 3,457, .. |

The following is a representative two-column format of CP codes and related bandwidth for the current_bw table:

| CPCODE | RATE_BYTES |
|--------|------------|
| 1      | 3,528      |
| 7      | 52         |
| 27     | 3,528      |

Thus, sum_bw table is the total month-to-date bandwidth, which is a historical number of total bytes served by the network (or portion thereof). In a representative embodiment, this information typically is current within a few hours, and the table is pushed to the network (or portion thereof) periodically (e.g., every six hours). Typically, this file is generated from a billing system. The current_bw table is the traffic in megabits per second, which in this embodiment is averaged over 3 windows of 3 second each (for each edge server). This table is updated on a periodic basis (e.g., but typically not more than every few minutes). The current_bw table is pushed out to the network periodically as well (e.g., every five minutes, so that the data is, at most, 10 minutes old). Of course, all of these values are configurable. Moreover, other load information files can be created for different services and pushed by the MDT system as the need arises.

Preferably, metadata for controlling the process is configurable for each customer and is made available to the edge server via the metadata transport mechanism. Any other convenient technique may be used. Preferably, the server manager reads the tables at startup and when the tables are updated by the metadata transport mechanism. Metadata for having the server manager process read the file "table1" (a representative name) in a representative table (e.g. . . . tables.data) is:

<md name= "table-file" table-name = "table1" allowed-min = "0" allowed-max = "100000" comment-lines = "5">on</md> where: table-name specifies both the file from which the server manager reads the data, and the name of the table for which the server manager will be able to match using the "table" match tag (explained below); allowed-min and allowed-max are values that protect the server manager from corrupted data by restricting the server manager from using a file if there is a value in the second column that is outside the allowed range (the manager may issue an alert if this occurs); and comment-lines (optional) specifies how many of the first lines in the file the server manager should treat as a comment and not read.

A metadata match tag allows the server manager to match on content from these tables. The metadata match has the form:

```
<match type = "table" table-name = "table1" cpcodes = "123,
    156-158" value = "3126">
``` where: table-name must match a table name property of a "table-file" metadata tag, cpcodes is a list of cp codes whose matching values should be summed and compared with the "value"; and value is the threshold at which the match will evaluate as true. If the sum of the usage information from the cpcode(s) listed in the tag is equal to or greater than this value, the match evaluates as true. This match example above will evaluate as true if the sum of the values for the cpcodes 123, 156, 157, and 158 in table1 exceeds 3126. Of course, these values are merely illustrative. Preferably, the matches may form a logical AND by nesting, e.g.:

```
<match type = "table" table-name = "table1" cpcodes = "123" value =
"126">
    <match type = "table" table-name = "table2" cpcodes = "123" value =
"3126">
    ....
    </match>
</match>
```

The above will match if cpcode 123 has a value greater than 126 in table1 and a value greater than 3126 in table2. Likewise, it is possible to form a logical OR of these matches by not nesting them. When a match is triggered, the server manager writes an indication to a log.

The server manager can also pass information from the tables to an ESI mechanism in the form of variables. Familiarity with ESI is presumed. For instance, in the velvet rope mechanism, ESI can assemble lighter pages if the customer is about to burst, for example:

```
<match type = "cpcode-range" value = "24">
    <md name = "pass-table-to-esi" variable-name = "variable1"
    table-name = "table1" cpcodes "24 28-30">on</md>
</match>
```

In this representative example, the above expression means that a request with cpcode 24 will pass to ESI the variable "variable1" that has the value of the sum of the loads for cpcodes 24, 28, 29 and 30 from table1. Of course, the above values are merely representative of the process.

The server process passes the load information to ESI preferably with a new header: X-cdnsp-ESI-variable: variable1=3465. If there are several variables to pass to ESI, these variables may be comma-separated.

The following is an example of how to use the velvet rope feature within ESI for the pass-table-to-esi tag, which (as specified in more detail below) provides a way to access bandwidth use so that customers have a way to constrain their use of the content delivery network to their contracted limits:

(1) The variable is passed to ESI as a key of a dictionary variable, TRAFFIC_INFO. If the variable created with the tag is called, BW1, then it is accessed in ESI as $(TRAFFIC_INFO{BW1}).

(2) This variable preferably is created as a floating point number, but, like other variables passed to ESI, it is accessed as a string in ESI. To do numeric comparisons, a rough conversion of the variable to an integer can be done by truncating the period (.) and everything after it, then converting the remaining integer-like string to an integer, using ESI functions as follows. In this example, the variable key passed to ESI is BW1.

$int($substrNTRAFFIC_INFO{BW1})), 0, $index($(TRAFFIC.sub.—INFO{BW1})), '.'))

This integer can then be used in evaluations. For example:

```
<esi:as sign name="NEW_BW" value="$int($substr($(TRAFFIC_
INFO{BW1})), 0, $index($(TRAFFIC_INFO{BW1})), '.')))"/>
    <esi:choose>
        <esi:when test="$int($(NEW_BW))>2000">
            $set_redirect('lightestweightfile.html')
        </esi:when>
        <esi:when test="($int($(NEW_BW))>1000)&($int($(NEW_
BW))<2000)">
            <esi:include src="secondary-file.html"/>
        </esi:when>
        <esi: otherwise>
            <esi:include src="primary_fragment.html"/> </esi:otherwise>
    </esi:choose>
```

This construction says to redirect the entire request to the lightest weight alternative if NEW_BW is over 2000; if NEW_BW is over 1000 but less than 2000, include a fragment that is lighter than the original but not the primary. Otherwise, use the primary fragment.

Thus, according to the subject matter described herein, the information in the bandwidth table or tables can be used in various ways, e.g., by providing metadata matches and/or by passing values to an ESI mechanism running in the edge server. The particular action to be taken when a given threshold is met (or substantially met) is then carried out per the established policy. Representative actions include, without limitation, limiting traffic served from the edge server until the load decreases, serving a lighter object, going forward to the customer's origin server, redirecting to another CDN location, issuing an alert, some combination of the above, or the like. Of course, these actions are merely representative.

The subject matter described herein provides numerous advantages. A main advantage is that the mechanism enables CDN customers needing to control their costs to control the amount of traffic that is served via the content delivery network. The velvet rope feature may have many supplemental features or variations. Thus, e.g., an alert may be provided to the customer when the monthly traffic (or traffic over some other arbitrary period) is approaching a given burst threshold, and the velvet rope mechanism is then activated as has been described. The customer may set up, via a secure portal or the like, the threshold values for bandwidth usage (e.g., in either MB delivered for the month or Mbps usage for the month), identify the relevant cpcodes, the given actions to be taken upon a match, and the like.

The following provides some additional details for the metadata tags referred to above. These details are not meant to limit the invention.

Velvet Rope—Usage Monitoring/Control

The following tags are used to implement the Velvet Rope feature, which provides for handling of requests based on current bandwidth as a rate or total megabytes served to date for a given month.

The first two tags below are used to specify the files that the server manager will read (table-file) and the thresholds at which the server manager will apply some other metadata to handle requests differently based on the table values (table match type).

The third tag makes the information in the tables available to ESI so that these values can be used by ESI to modify the page being served.

Table-File

This tag specifies the tables that the server manager will read at startup and when they are updated. Because the tables are accessible for each customer, it is preferable to put the metadata for table-file in a data section of global baseline configuration.

The metadata for having the server manager read the file "table1" (a fictitious name) in a/etc/ghost.tables.data is

```
<md:table-file table-name="table1" allowed-min="0" allowed-max,
"100000" comment- lines="5">on</md:tabl- e-file>
``` table-name specifies the file from which ghost will be reading the data. This is then a table for which ghost will be able to match using the "table" match tag (explained below).

allowed-min and allowed-max protect ghost from corrupted data. Ghost will not use a file if there is a value in the second column that is outside the allowed range. The server manager will publish an alert (ALERT_BAD_TABLE_FILE) if the file contains invalid data.

comment-lines specifies how many of the first lines in the file ghost should treat as comment and not read. By default the server manager ignores the first 3 lines of the file.

Table (Match Type)

Matches on content from bandwidth tables. The syntax for this match is:

```
<match:table table-name="table1" cpcodes="int int-int" value="int">
</match:table>
``` table-name must match a table name property of a "table-file" and tag. Essentially, there cannot be a match on the information in a table that has not been read. (The table-file tag declares the files which the server manager should read.)

cpcodes is a list of cp codes whose matching values should be summed and compared with the "value"

value is the threshold at which the match will evaluate as true. If the sum of the usage info from the cpcodes listed in the tag is equal to or greater than this value the match evaluates to true.

Pass-Table-to-esi

This tag is one of a number of "velvet rope" tags, which provide a way to access bandwidth use so that customers can constrain their use of the content delivery network to their contracted limits. The syntax of the tag is:

```
<md:pass-table-to-esi variable-name="string " table-
name="ghost.tables.data.current_bw"
cpcodes="24 28-30">on</md:pass-table-to-esi>
``` variable-name takes any string and becomes the name used to reference the value from the table when the variable is used within ESI.

table-name takes the name of a table that the server manager has been instructed to read. There are several tables available to the server manager:

ghost.tables.data.sum_bw, which represents the sum in Megabytes since the beginning of the month.

ghost.tables.data.current_bw, representing the current Megabits-per-second.

ghost.tables.data.current_streams, the current number of streams in use by streaming customers.

cpcodes takes a space separated list of cpcodes or cpcode ranges whose values should be taken from the table and summed.

The value of the tag is a simple boolean to turn on or off the passing of these values.

For example,

```
<match:cpcode-range value="24">
    <md:pass-table-to-esi variable-name="BW1" table-
name="ghost.tables.data.current_bw"
    cpcodes="24 28- 30">on</md:pass-table-to-esi>
    </match:cpcode-range>;
```

This tag says that a request with cpcode 24 will pass to ESI the variable "BW1" (the name defined by the user) that has the value of the sum of the loads for cpcodes 24, 28, 29 and 30 from current_bw. Note that if metadata is inside a configuration file where the basic cpcode match is determined by a metadata tree, the cpcode match is not needed.

As noted above, the subject matter described herein may also be useful for streaming media delivery. In streaming media delivery, a given edge server includes appropriate server software, such as Windows Media server, Real server, or the like. The described subject matter enables the service provider to provide a mechanism to help a content provider customer to control bursting (use over a given contract value) so that it can stay within an allocated cost budget. In one embodiment, the invention provides the customer the ability to select among various actions such as: notification, enforcement, or both notification and enforcement of customer defined thresholds.

Preferably, a customer provides applicable customer settings through a secure extranet application such as a customer portal. This is not a limitation, of course, as any convenient mechanism may be used for this purpose. These settings include, for example, definitions on what type of threshold should be set and at what value, specification of what action to take when the threshold is reached, contact information if the customer chooses to be notified when the above threshold has been reached and, optionally, some customer identifier (e.g., a content provider or CP code) to which the threshold applies. Available threshold types might include, for example: megabytes (MB) delivered from start of the beginning of a month, number of concurrent streams, current bandwidth bps, or the like. The specification of actions might include, for example: request d denial (the stream will not be served), do nothing (when a customer merely is interested in notification, but not enforcement), or the like.

Thus, as described above, the described invention allows customers to define a threshold and request that the one or more edge servers enforce that threshold by not serving streams when that threshold has been met. Preferably, this functionality is available on a per CP code basis. Generalizing, there are three basic steps to implement this functionality: collection of usage information within the network; collection of customer specified threshold information; and finally, a check and action against the combination of those two pieces of data. How often the usage data is collected is dependent on the data. For MB delivered, the data preferably is accumulated over a monthly billing cycle and is updated periodically, e.g., every few hours. For both concurrent number of streams and bps bandwidth data, the data preferably is updated every few minutes. Threshold information preferably is collected via the customer portal, as mentioned above. Preferably, notification thresholds are defined independent of enforcement thresholds. This is done to provide the most flexibility to customers and to enable, for example, the ability to react to a spike in traffic without necessarily denying delivery of streams. Correspondingly, notification alerts, e.g., via email, may be activated as soon as they are defined, and enforcement thresholds may be activated within a reasonable time after definition to ensure they are properly configured. On each request for a stream, a given streaming edge server (to which an end user has been directed) compares the usage and threshold information. If the usage information does not exceed the threshold information, the streaming request is served as normal. If the usage information exceeds the threshold, the server denies access to the streaming request.

In an illustrative embodiment, the mechanism controls three parameters for a given content provider code (cpcode): total number of concurrent connections, bandwidth in bits/sec, total Mbytes bytes served through the month. If a customer has multiple CP codes that require the velvet rope (VR) function, it may specify VR for each CP code. When a streaming server on edge machine gets a request (rtsp, mms and etc.), the streaming server preferably extracts the CP code from the URL and composes a translation request. The request, e.g., contains a hostheader "cpxxx.cdnsp.ffs.rules" where "xxx" is the CP code. The server manager uses the corresponding metadata file according to the hostheader to define the VR parameters and VR threshold. If the VR limit is reached, the server manager may returns an http status code "403" (Forbidden) to the client side streaming media player) and hence denies the client request.

As an example, assume customer FOO wants to apply VR to its cpcode 8000 to limit number of connections below 10,000. A metadata file FOO.com is generated and made available to the edge servers. In particular, a configuration file for the manager process is configured to make hostname cp8000.cdnsp.ffs.rules use metadata FOO.com. In the configuration file, this is implemented as: <hct>FOO.com 1 1 cp8000.cdnsp.ffs.rules 1;</hct>

In the FOO.com, the following metadata can then be implemented:

```
<originMap tree="1">
  <originServer value="foo.com">
```

-continued

```
    <hostHeader>cp8000.cdnsp.ffs.rules</- hostHeader>
  </originServer>
</originMap>
<md name="cpcode">123</md>
<md name="serial">456</md>
<tree name="1"> <match type="table"table-
name="tables.data.current_streams"cpcodes="80- 00" value="10000">
    <md name="deny">on</md>
    <md name="add-client-header">X-cdnsp-streaming-reason: too many streams</md>
  </match>
</tree>.
```

What is claimed is:

1. Apparatus for constraining bandwidth consumption in a distributed network, comprising:
   one or more hardware processors;
   an edge side include (ESI) mechanism executed on one of the hardware processor for parsing and processing content provider-specific markup language pages, at least one content provider-specific markup language page including an edge side include (ESI) defined by a set of ESI tags, the ESI tags delineating content provider-specific metadata, the metadata comprising a bandwidth threshold, and an action to take to reduce bandwidth consumption if the bandwidth threshold is met; and
   software executed on one of the hardware processors in response to a request for content (i) to compare delivery data with the content provider-specific metadata in the edge side include to determine whether the bandwidth threshold has been met, and (iii) to enforce the action to reduce the bandwidth consumption if the bandwidth threshold has been met.

2. The apparatus as described in claim 1 wherein the action is delivery of a modified version of the content.

3. The apparatus as described in claim 1 wherein the action is a serving an HTTP redirect.

4. The apparatus as described in claim 1 wherein the content is HTTP content.

5. The apparatus as described in claim 1 wherein the content is a data stream.

6. The apparatus as described in claim 1 wherein the delivery data comprises usage statistics.

7. The apparatus as described in claim 6 wherein the usage statistics comprise month-to-date bandwidth usage for a content provider.

8. The apparatus as described in claim 6 wherein the usage statistics comprise current bandwidth usage for a content provider.

9. The apparatus as described in claim 1 wherein the software is one of: a media server, and a web proxy.

10. The apparatus as described in claim 1 wherein the determination of whether the bandwidth threshold has been met is based on a given time period.

* * * * *